United States Patent [19]

Rumberger

[11] Patent Number: 5,205,512

[45] Date of Patent: Apr. 27, 1993

[54] FLUID CONTROL APPARATUS

[75] Inventor: William E. Rumberger, Newtown Square, Pa.

[73] Assignee: The Boeing Company, Seattle, Wash.

[21] Appl. No.: 746,635

[22] Filed: Aug. 19, 1991

[51] Int. Cl.[5] .................................................. B64C 27/82
[52] U.S. Cl. ..................................... 244/17.19; 244/52; 60/228; 60/230
[58] Field of Search ................... 244/17.19, 17.21, 52; 239/487, 488, 467, 501; 60/228, 230, 232

[56] References Cited

U.S. PATENT DOCUMENTS

| | | | |
|---|---|---|---|
| 1,380,834 | 6/1921 | Parker et al. | 239/487 |
| 1,422,384 | 7/1922 | South | 244/52 |
| 1,714,917 | 5/1929 | Martin | 244/52 |
| 2,305,210 | 12/1942 | Wahlin | 239/487 |
| 2,470,348 | 5/1949 | Haight, Jr. | 60/228 |
| 2,486,272 | 10/1949 | Gazda | 244/17.19 |
| 2,518,697 | 8/1950 | Lee | 244/17.19 |
| 2,804,338 | 8/1957 | Johnston | 239/487 |
| 2,993,463 | 7/1961 | McKinney | 60/232 |
| 2,999,648 | 9/1961 | Wahlin et al. | 239/487 |
| 3,015,460 | 1/1962 | Christenson | 244/17.19 |
| 3,040,696 | 6/1962 | Dahle | 60/230 |
| 3,351,304 | 11/1967 | Stein et al. | 244/17.19 |
| 3,807,662 | 4/1974 | Velazquez | 244/17.19 |
| 3,957,226 | 5/1976 | Daggett, Jr. et al. | 244/52 |
| 4,200,252 | 4/1980 | Logan et al. | 244/17.19 |
| 4,660,785 | 3/1987 | Munski | 244/52 |
| 4,948,068 | 8/1990 | VanHorn | 244/17.19 |

Primary Examiner—Joseph F. Peters, Jr.
Assistant Examiner—Anne E. Bidwell
Attorney, Agent, or Firm—Jones, Tullar & Cooper

[57] ABSTRACT

A fluid control apparatus for proportionally directing fluid from a single conduct to multiple exhaust ports around the periphery of the duct. A controller is provided which is rotatably supported in the duct by an axial shaft. The shaft supports a radial barrier vane extending along its length and a helical vane forming a single 360° helical wall surrounding the shaft. Rotation of the controller exhaust to shaft axis directs the fluid to the appropriate exhaust ports according to its angular position.

2 Claims, 2 Drawing Sheets

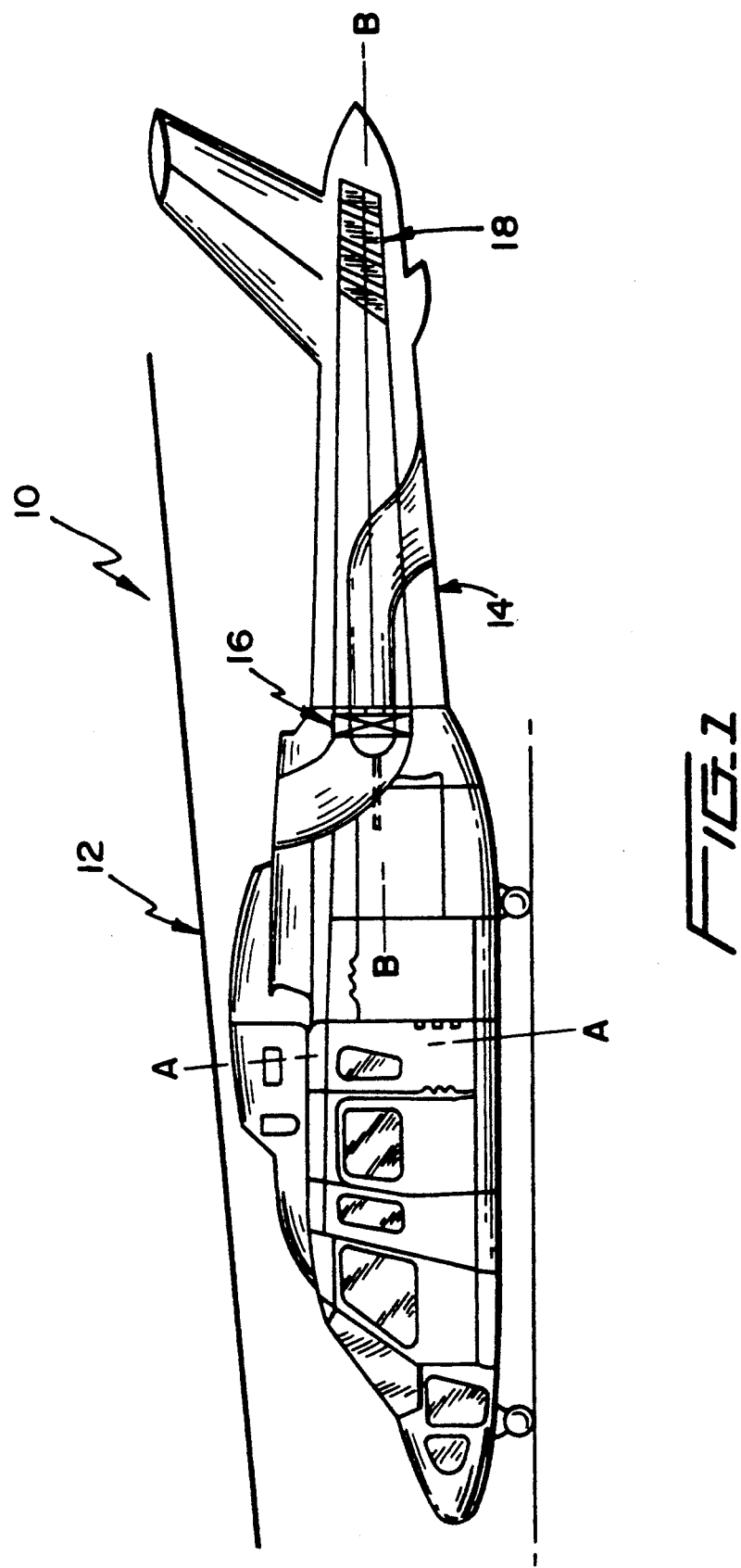

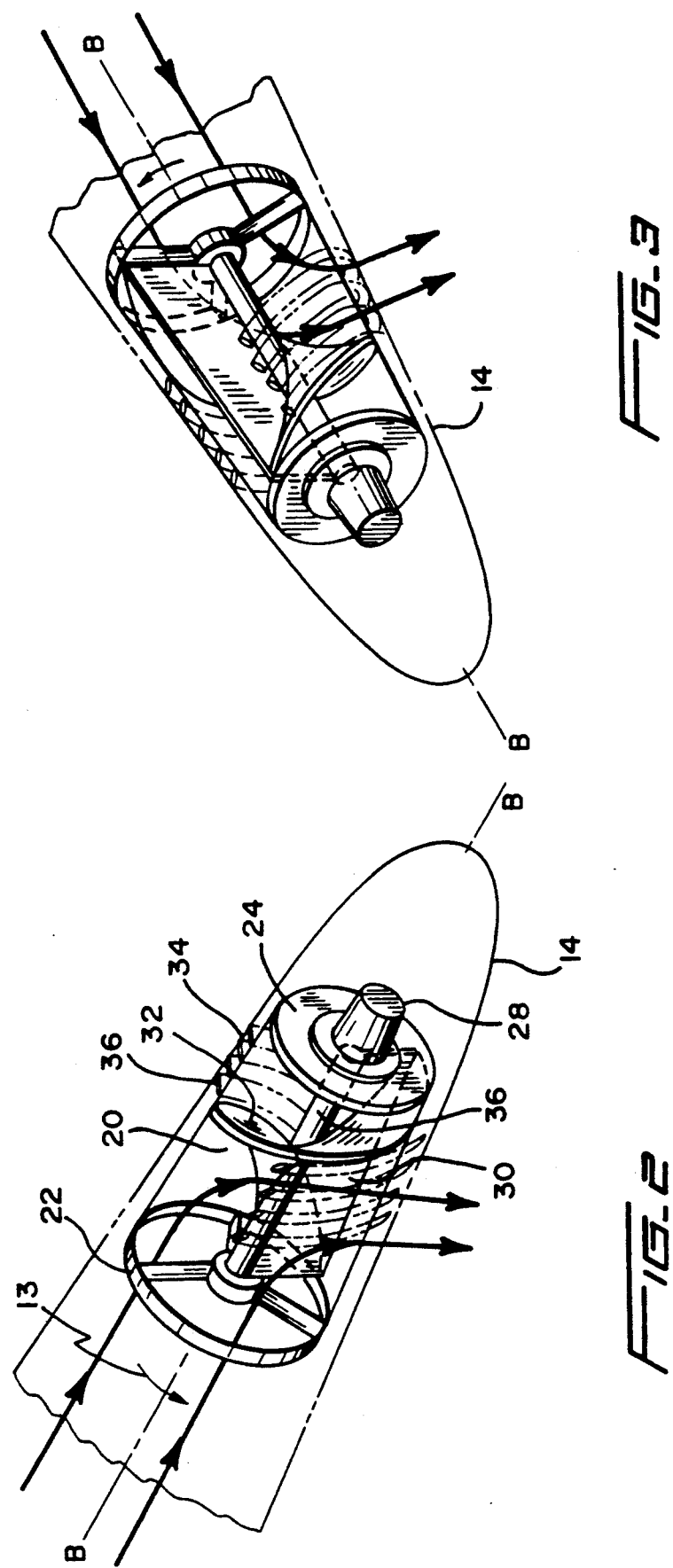

FLUID CONTROL APPARATUS

BACKGROUND OF THE INVENTION

This invention relates in general to a fluid control apparatus and in particular to a control apparatus which uses a helical vane, rotatable about a longitudinal axis of a fluid duct, to direct the fluid out of lateral exhaust ports located on either side of the fluid duct to provide lateral thrust in either direction transverse of the axis of the duct or, by positioning the helix in the neutral position, cause no lateral reaction on the duct.

The invention is particularly useful to provide directional control and stability to a single rotor helicopter. Typically, single rotor helicopters utilize a tail rotor located at the aft end of the tail boom to counteract the torque from the main rotor rotation and to provide directional control moments to the aircraft.

A number of designs have been suggested in which the tail rotor is replaced by fluid jets located in the tail boom of the helicopter.

Such designs are disclosed in U.S. Pat. Nos. 3,486,272, 2,418,697 and 3,957,226, and also in U.S. patent application Ser. No. 07/665,239, filed on Mar. 6, 1991 and assigned to the assignee of this invention.

In these prior art devices, the exhaust fluid is directed from the tail boom duct using movable vanes which swivel about a vertical axis or by axially sliding doors which selectively open exhaust ports on either side of the tail boom. These mechanisms are usually complicated in design and requires substantial actuation force to move the control surfaces into the air stream or have high sliding frictional resistance.

It would, therefore, be desirable to provide a fluid control means which is simple in mechanical design and requires a minimum of power for actuation.

SUMMARY OF THE INVENTION

A fluid control apparatus is described which utilizes a single, helical vane rotary control device which uses only a single simple rotary actuator to direct fluid to the lateral exhaust ports in the proper proportion to provide the helicopter with lateral stability and control.

A control apparatus is constructed as a hollow cylindrical chamber or slightly tapered cone shaped chamber which conforms generally to the external shape of the helicopter tail boom. The control cylinder accepts pressurized fluid from a source forward of the tail boom into the internal chamber of the controller. The controller chamber is divided into two sections by a barrier vane extending from the central shaft which supports the controller to the interior wall of the duct. This barrier vane wipes the internal wall of the duct as the controller shaft is rotated. The controller chamber is further divided into two helical chambers by a helical vane extending the length of the controller and surrounding the central shaft and terminating at each end of the barrier vane. The outer edge of this helical vane also wipes the internal wall of the duct. These vanes form a movable seal between the controller and the internal duct wall.

As is described in greater detail further in the specification, rotation of the controller vanes about the duct axis permits the control fluid to be directed out exhaust ports on either side of the tail boom. The angular position of the helical vane determines the direction and strength of the lateral thrust provided by the exhaust ports.

BRIEF DESCRIPTION OF THE DRAWINGS

FIG. 1 is an elevation view of a single rotor helicopter configured to utilize the invention;

FIG. 2 is a cut-away isometric view of the aft left side of the helicopter showing the controller in a position to provide maximum lateral thrust toward the left side of the helicopter;

FIG. 3 is a cut-away isometric view of the aft right side of the helicopter showing the controller in a position to provide maximum lateral thrust toward the right side of the helicopter.

DETAILED DESCRIPTION OF THE PREFERRED EMBODIMENT

The helicopter 10 illustrated in FIG. 1, is a single rotor helicopter having a single main rotor 12 which produces lift and forward thrust for the helicopter. Typically, such a helicopter has a tail rotor (not shown) located at the end of the tail boom 14. The tail rotor produces a force directed laterally outward from the tail boom. This force results in a torque which prevents the main rotor torque from rotating the helicopter about the main rotor shaft axis A—A. Since this torque opposes the main rotor torque, the force that it produces is referred to as an anti-torque force. This force, moreover, can be varied by pilot input, which in turn varies the anti-torque force generated. Directional control of the helicopter is thus effected.

The present invention is disclosed in its preferred embodiment applied to such a helicopter in which a typical tail rotor has been replaced by a fluid directing system to provide the anti-torque function and lateral control for the aircraft.

The essential parts of this system which produce this anti-torque force are a source pressurized fluid 16 which directs a fluid stream along the interior of the tail boom generally along axis B—B to a force directing apparatus located generally at 18. The fluid source may be engine exhaust gas or may be generated by a separate fan powered by exhaust gases or other power source in the helicopter.

Referring now to FIGS. 2 and 3, these cut-away views show the controller in extreme positions of actuation. In FIG. 2 the controller is positioned to provide maximum fluid flow and therefore maximum lateral thrust to the left side of the aircraft. As shown in these FIGS. 2 and 3, the working fluid is propelled along the fluid duct 13 formed by the internal walls of the tail boom 14 generally along the duct axis B—B. The controller generally shown at 20, is made up of a first vane support member 22 having multiple openings in its upstream end to allow the working fluid to enter the controller chamber. The other end of the controller chamber is closed by a solid bulkhead member forming a second vane support member 24. The vane support members are connected by shaft 26, supported for rotation generally about B—B by bearings (not shown). Attached to one end of the shaft 26 is rotary actuator 28 of any well known type, for rotating the controller 20 about axis B—B. Attached to shaft 26 is a barrier vane 30 which extends radially from shaft 26 to the internal wall of duct 13 in a movable sealing relationship and longitudinally from the first vane support member to the second vane support member, therefore forming two axial chambers in the controller body. A helical vane member 32 is attached at each end of the barrier vane 30 and the shaft 26 and the two vane support members 22 and 24. The helical vane member 32 forms a single 360° helical wall along the shaft 26 and is in a rotatable sealing engagement with the internal wall of the duct 13 to form a movable seal therebetween.

The tail boom is provided with exhaust ports 34 which connect the controller chambers with the outside of the tail boom. These exhaust ports 34 are formed by fixed vanes 36 on both sides of the tail boom. In FIG. 2, the barrier vane is shown in a downward position. In this position, fluid from the fluid source is directed only out of ports on the left side of the tail boom by the helical vane 32. The fluid is prevented from exiting to the right hand ports by the barrier vane 30, and by virtue of its rotary position, the other portion of the helical vane 32. In FIG. 3, the controller has been rotated 180° to place the barrier vane in the upward vertical position. In this position all of the available fluid is directed out of ports 34 on the right side of the tail boom and ports 34 on the left side of the tail boom are sealed off by the barrier and helical vanes 30 and 32 as described in the description of FIG. 2 above.

As can be seen from the above discussion, when the vanes are positioned between the extreme positions shown in FIGS. 2 and 3, control fluid will be directed out of the exhaust ports on both sides of the tail boom. The net control force applied to the aircraft will be in proportion to the angular position of the controller assembly 20.

Thus it can be seen from the above description that this invention provides a simple, proportional control of a fluid exhaust out of multiple ports. The force exerted by the fluid will be in proportion to the angular position of the controller. The controller is rotated by a single, simple rotary actuator. The invention has been described in connection with a helicopter antitorque device. However, it will be recognized by those skilled in the art that the invention may be applied in many circumstances where fluid flowing in a single duct is to be proportionally directed to multiple exhaust ports.

What is claimed is:

1. A fluid control apparatus for controlling the direction of flow of a pressurized fluid comprising:
    a fluid duct for containing a pressurized fluid, said duct having an axis defining a direction of flow in the duct;
    fluid exhaust means arranged around the periphery of said duct for exhausting fluid in a specified direction;
    rotary fluid control means for directing fluid flow to preselected exhaust means, said fluid control means comprising;
    a shaft supported in said duct for rotation about the axis of said duct;
    a control chamber mounted on said shaft for rotation therewith and connected to said duct for receiving fluid therefrom;
    barrier vane means in said control chamber attached to said shaft and extending radially from said shaft and forming a moveable seal with the interior wall of the duct;
    helical vane means in said control chamber attached to said shaft for rotation therewith, said helical vane means forming a helical chamber within said control chamber, its exterior edge forming a moveable seal with the interior wall of said fluid duct; and
    actuator means attached to said shaft for rotating said shaft about the axis of the fluid duct.

2. A fluid control appartus according to claim 1 and further comprising:
    first vane support means for supporting said vane means and forming one end of the control chamber on the upstream side of said fluid duct and having openings to allow fluid to enter said control chamber;
    second vane support means for supporting said vane means and forming a solid bulkhead at the downstream end of the control chamber.

* * * * *